(12) United States Patent
Tiotantra et al.

(10) Patent No.: US 11,592,984 B2
(45) Date of Patent: Feb. 28, 2023

(54) ONBOARD MACHINE LEARNING FOR STORAGE DEVICE

(71) Applicant: Seagate Technology LLC, Fremont, CA (US)

(72) Inventors: Harry Tiotantra, Singapore (SG); Jun Cai, Singapore (SG); Kai Chen, Singapore (SG); WeiQing Zhou, Singapore (SG); Feng Shen, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 124 days.

(21) Appl. No.: 17/018,016

(22) Filed: Sep. 11, 2020

(65) Prior Publication Data

US 2022/0083230 A1    Mar. 17, 2022

(51) Int. Cl.
  *G06F 12/00*    (2006.01)
  *G06F 3/06*    (2006.01)
  *G06F 17/18*    (2006.01)
  *G06N 20/00*    (2019.01)

(52) U.S. Cl.
  CPC .......... *G06F 3/0607* (2013.01); *G06F 3/0659* (2013.01); *G06F 3/0685* (2013.01); *G06F 17/18* (2013.01); *G06N 20/00* (2019.01)

(58) Field of Classification Search
  CPC .... G06F 3/0607; G06F 3/0659; G06F 3/0685; G06F 17/18; G06N 20/00
  See application file for complete search history.

(56) References Cited

U.S. PATENT DOCUMENTS

| | | | | |
|---|---|---|---|---|
| 5,884,080 | A * | 3/1999 | Blandy | G06F 11/3409 717/130 |
| 6,604,178 | B1 * | 8/2003 | Hall | G06F 3/0601 710/39 |
| 8,639,026 | B2 | 1/2014 | Lin | |
| 9,141,916 | B1 * | 9/2015 | Corrado | G06F 7/483 |
| 10,540,611 | B2 | 1/2020 | Reese et al. | |
| 11,222,258 | B2 * | 1/2022 | Nagarajan | G06N 3/084 |
| 2004/0184417 | A1 * | 9/2004 | Chen | H04L 1/20 370/328 |
| 2005/0108399 | A1 * | 5/2005 | Bouknight | H04L 49/9052 709/224 |
| 2012/0140066 | A1 | 6/2012 | Lin | |
| 2015/0377667 | A1 * | 12/2015 | Ahmad | G01N 29/14 702/48 |
| 2017/0154261 | A1 | 6/2017 | Sunehag | |
| 2017/0249580 | A1 | 8/2017 | Newman et al. | |
| 2018/0082212 | A1 | 3/2018 | Faivishevsky et al. | |
| 2018/0240010 | A1 | 8/2018 | Faivishevsky et al. | |

(Continued)

*Primary Examiner* — Shawn X Gu
*Assistant Examiner* — Mohammad S Hasan
(74) *Attorney, Agent, or Firm* — Westman, Champlin & Koehler, P.A.

(57) ABSTRACT

A method includes receiving at a storage device a command from a host. When learning is active on the storage device, an initial parameter value of a plurality of parameter values is used for performing a first action of a plurality of actions for the command. The first action is performed using the initial parameter value of the plurality of parameter values for the command The first parameter value is incremented to a next parameter value of the plurality of parameter values for the command for use in reperforming the first action.

20 Claims, 5 Drawing Sheets

(56) References Cited

U.S. PATENT DOCUMENTS

| | | | |
|---|---|---|---|
| 2019/0042142 A1* | 2/2019 | Casmira | G06F 3/0659 |
| 2019/0114275 A1* | 4/2019 | Dropps | G06F 12/0862 |
| 2019/0200244 A1* | 6/2019 | Polepalli | H04W 36/06 |
| 2019/0265764 A1* | 8/2019 | Ping | G05B 13/026 |
| 2019/0278648 A1 | 9/2019 | Nayak et al. | |
| 2019/0362261 A1 | 11/2019 | Ahn | |
| 2019/0377982 A1* | 12/2019 | Ando | G06N 20/10 |
| 2020/0004435 A1* | 1/2020 | Borlick | G06F 3/0653 |
| 2020/0027444 A1* | 1/2020 | Prabhavalkar | G10L 15/16 |
| 2020/0078638 A1* | 3/2020 | Statham | A61B 5/1038 |
| 2020/0090073 A1* | 3/2020 | Zhan | G06N 20/00 |
| 2020/0104573 A1* | 4/2020 | Chen | G06F 3/012 |
| 2020/0159230 A1* | 5/2020 | Marasigan | G06N 20/00 |
| 2020/0202235 A1 | 6/2020 | Chen et al. | |
| 2020/0355387 A1* | 11/2020 | Samuni | G05B 23/0254 |
| 2020/0364561 A1* | 11/2020 | Ananthanarayanan | H04L 63/1425 |
| 2020/0379755 A1* | 12/2020 | Boada | G06F 16/93 |
| 2021/0014201 A1* | 1/2021 | Crabtree | G06N 5/022 |
| 2021/0182661 A1* | 6/2021 | Li | H04L 41/145 |
| 2021/0232322 A1* | 7/2021 | Liang | G06F 3/0673 |
| 2021/0234865 A1* | 7/2021 | Rose | H04L 63/0272 |
| 2021/0241912 A1* | 8/2021 | Chazin | G08B 21/0446 |
| 2021/0304068 A1* | 9/2021 | Chiang | G06F 3/0604 |
| 2022/0004456 A1* | 1/2022 | Achtenberg | G11C 16/26 |

* cited by examiner

ONBOARD MACHINE LEARNING FOR STORAGE DEVICE

SUMMARY

In one embodiment, a method includes receiving at a storage device a command from a host. When learning is active on the storage device, an initial parameter value of a plurality of parameter values is used for performing a first action of a plurality of actions for the command. The first action is performed using the initial parameter value of the plurality of parameter values for the command The first parameter value is incremented to a next parameter value of the plurality of parameter values for the command for use in reperforming the first action.

In another embodiment, a method includes receiving a command from a host, and choosing an action to be performed based on the received command. The action is performed using a first parameter value of a plurality of parameter values for the action, and an action time for the performed action using the first parameter value is stored. The parameter value is incremented to a next parameter value of the plurality parameter values for the action, and the action is performed again using the next parameter value of the plurality of parameter values for the action. An action time is stored for the performed action using the next parameter value. Selecting, performing, and storing again is repeated until all parameter values of the plurality of parameter values have been used to perform the action.

In another embodiment, a non-transitory computer-readable storage medium includes instructions that cause a data storage device to receive a command from a host, and to choose an action to be performed based on the received command. The instructions further cause the data storage device to perform the action using a first parameter value of a plurality of parameter values for the action, and to store an action time for the performed action using the first parameter value. The instructions further cause the data storage device to increment the parameter value to a next parameter value of the plurality of parameter values for the action, perform the action again using the next parameter value of the plurality of parameter values for the action, store an action time again for the performed action using the next parameter value, and repeat selecting, performing, and storing again until all parameter values of the plurality of parameter values have been used to perform the action.

This summary is not intended to describe each disclosed embodiment or every implementation of onboard machine learning storage devices as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

In general, embodiments of the disclosure provide onboard machine learning for storage devices, and more particularly, to surveillance shingled magnetic recording (SMR) storage. Virtualization in SMR technology is of increasing importance in the industry, despite the large amount of workload and numerous internal data flow processes. Such workload is simultaneous or contemporaneous to managing host commands. Surveillance storage, due to the largely sequential nature of its data, and the lower and more manageable bandwidth usage compared to other more random storage events, is amenable to SMR storage schema. While the embodiments of the present disclosure are amenable to use with all types of storage, such as conventional magnetic recording (CMR), SMR, and the like, particular advantage may be found with SMR uses.

In SMR drives with virtualization, that is, when logical to physical address correspondence is not one to one, when a customer initiates requirement changes in an SMR drive with virtualization, re-optimization is to be performed quickly and accurately over multiple drive rewrites. Storage solutions are expected to adapt forward quickly and accurately without sacrificing current stability and backward compatibility. With high capacity, multiple-drive setups, such as are often found in surveillance SMR, this can take a very long time. Further, different customers have different workloads and different features that are used for various states of the drives and the commands. In addition, small portions of random-access workloads are being added progressively in more recent usage profiles for data storage, especially in SMR. Because of all of this, improvement of response times for actions, such as but not limited to read access, write, prefetch, and the like, would be very helpful.

Previously, handling a challenge to the workload of a re-optimization due to changes would be done using debug information and offline simulation to refine improvements to process flow for the challenging workload situation. Workload cycles for rewrites can easily span multiple days, and have expanded beyond the capacity for human debugging in suitable time frames. Further, the sheer amounts of data and number of actions of storage to data storage devices is performed within a time frame that is acceptable for large amounts of data manipulation, and with embodiments of the present disclosure, is performed with a real time workload in the machine. Advantages of such embodiments include, by way of example only and not by way of limitation, automation of learning, whereas simulations have additional steps required such as capturing the bus rate, processing data further to make calculations, and building simulation or modelling constructs. Still further, even after all of that is done, it is not feasible to capture an entire workload. Therefore, hand calculated simulations are not done based on a complete workload but instead on a sample. In contrast, machine on board learning such as in the embodiments of the present disclosure can capture an entire workload, making learning more complete while also being faster.

A machine learning framework for the methods of the present disclosure includes receiving a command as input, and if learning is inactive, returning the best known action. If there is time to process the action in a current time window, calculate and store the value of selected action, then increment the action selector. Following that, return the action selected.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
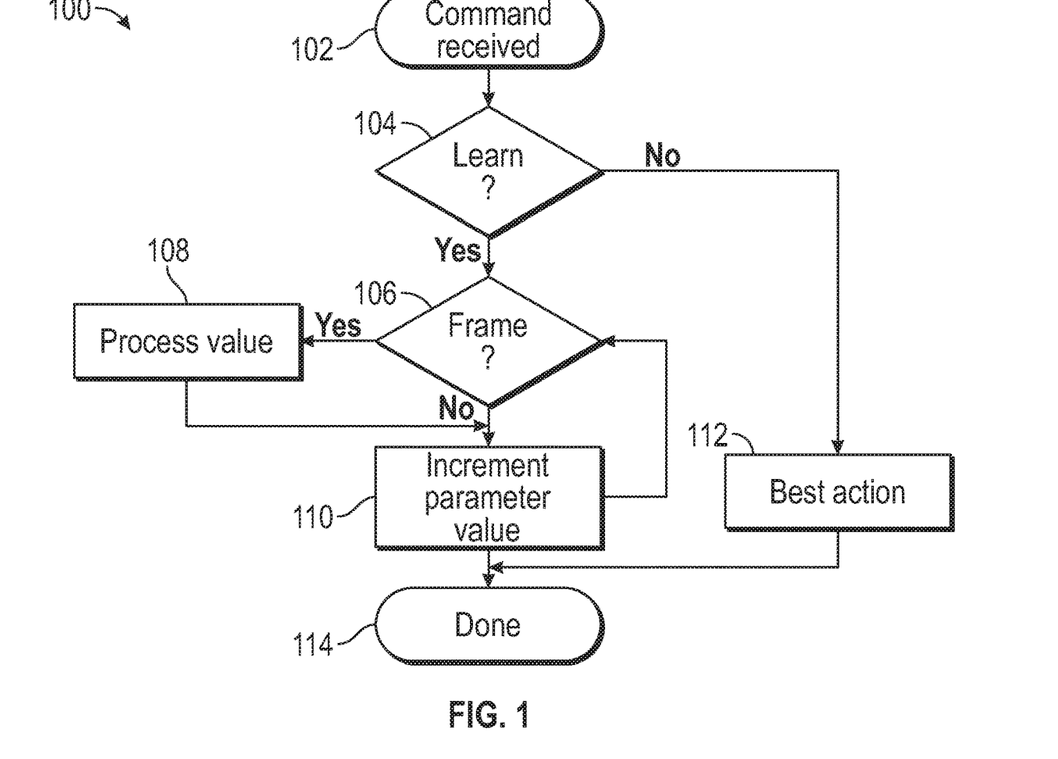
FIG. 1 is a flow chart diagram illustrating a method according to an embodiment of the present disclosure.
Figure 2:
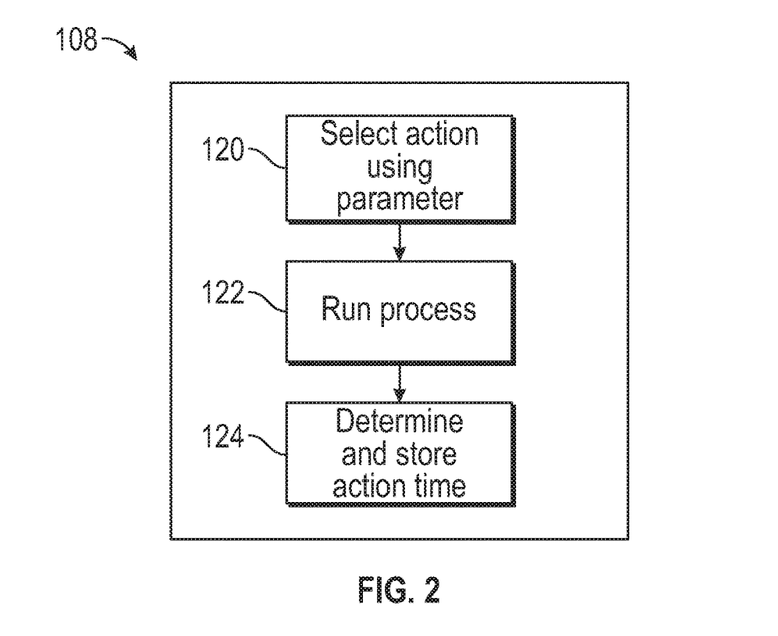
FIG. 2 is a flow chart diagram of further detail according to an embodiment of the present disclosure.

A flow chart for a method 100 according to an embodiment of the disclosure is shown in FIG. 1. Method 100 comprises, in one embodiment, receiving a command at a data storage device or system in block 102. Once the command is received, it is determined in decision block 104 whether machine learning is active. If machine learning is not active, the data storage device/system returns its best known action at block 112, and the process ends at block 114. If machine learning is active, as determined by decision block 104, then a determination is made as to whether the time frame for machine learning is sufficient to run an action. If the time is sufficient to run an action, then the action is run at block 108. Block 108 is shown in further detail in FIG. 2. In block 108, an action using a parameter is selected from the plurality of actions in block 120, the process is run in block 122 and an action time for the action is determined and stored for the selected parameter in block 124. The action selector is incremented in block 110 to select a next parameter of the plurality of parameter values. If learning is still active, and time remains for processing further, the method returns to block 106 to process another parameter for the action as described above. When the learning time frame is over, the process completes at block 114. During learning, whenever a command is received, and time remains in the learning window, process values (e.g., parameters chosen from a plurality of parameters for the specific action) are chosen in incremental fashion to determine what parameters and values provide the fastest response. While the fastest response is discussed, for different workflow, it should be understood that the determination of what parameter to use for an action may be determined based not on a quickest response time, but on a different factor, for example, a most stable response, a response with the least amount of error, or the like.

Actions as used in this specification are the different settings of the parameters for the command. For example, in a read command, there is a determination made to cache data or not to cache data. Variables for which parameter values may be learned include a limit to the amount of backup space and a limit to the cache size for a particular data storage device. On a specific read command, a determination is made whether to cache data or not. Machine learning allows the determination, based on iterations and learning through the processing of the action for a number of values of parameters, to determine in which situations data should or should not be cached in a buffer.

This is simply one example of an action. A decision is made based on parameter values whether to include data in buffer or not. Machine learning allows decisions to be made as to what amount of data is cached. For example, if a small amount of data is to be read, it may be left in the buffer. If the amount is not small, the data is not kept in the buffer. Machine learning may be used to determine what value of "small" or "large" is best for buffering versus not buffering. There is a threshold of the amount of data that is the tipping point value to decide whether the amount of data is small or large. Iteration through various values and machine learning is used to determine what that tipping point is.

Actions are therefore used for determining values for at least one and perhaps many parameters, and what values for those parameter(s) process things the fastest. For each command, there are a number of parameters. Machine learning according to embodiments of the present disclosure allow learning, in real world operation, to improve command execution speed, efficiency, or reliability. Based on command and what actions are to be performed, machine learning iterates to determine what parameter values in the command work best for the command. Workload is a series of a number of commands. A learning frame for determination of parameter values for a workload may be set, for example, at 15 minutes or more.

Another example for determining parameters is based on performance tuning for a specific type or size of workload. Each end user may have different workloads and feature sets, so a general workload command iteration will be based on the different workloads and determined parameters based on specific command sets and types of data. Workload could be high definition (HD) video, low definition (LD) video, one or a few cameras, or many cameras; RAID/non-RAID systems, or the like. Once the parameters are known, iteration to improve the values of the parameters allows machine learning for an entire workload to improve the workload speed and efficiency, all automated with machine learning according to embodiments of the present disclosure.

Figure 3:
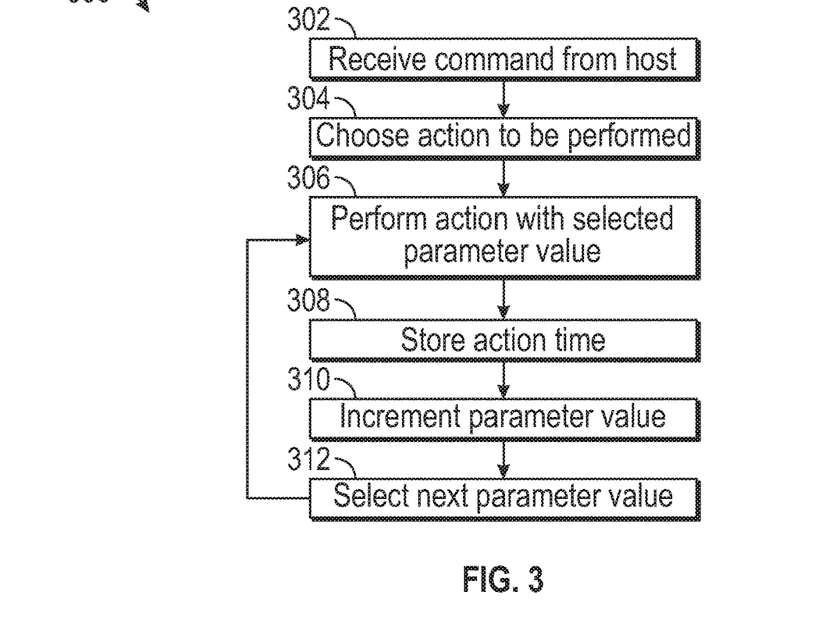
FIG. 3 is a flow chart diagram illustrating a method according to another embodiment of the present disclosure.

A method 300 according to another embodiment of the present disclosure is shown in flow chart diagram in FIG. 3. Method 300 comprises, in one embodiment, receiving a command from a host at block 302, and choosing an action to be performed based on the received command in block 304. The action is performed using a selected parameter value of a plurality of values for the parameter for the action in block 306. An action time for the processed action using the selected parameter value at least one parameter is stored in block 308. The parameter value is incremented in block 310, and a next parameter of the plurality parameters for the action is selected in block 312. The action is performed and an action time stored for the next parameter by the repetition of blocks 306 and 308. The process is repeated until the learning time is complete. This may result in a large number of repetitions of actions for each parameter. To determine a starting parameter for a second round of learning, or for assigning a specific parameter for the action, an average time may be determined for each parameter over the number of times the parameters is processed for the action.

In additional process blocks, the parameter corresponding to a shortest action time is stored as a preferred parameter.

Further, when all parameters of the plurality of parameters have been timed for processing the action, the process is repeated for a full learning period of a time determined by a user. In one embodiment, a shortest time for each action is determined to be an average of the shortest times for repeated processes during the full learning period.

Figure 4:
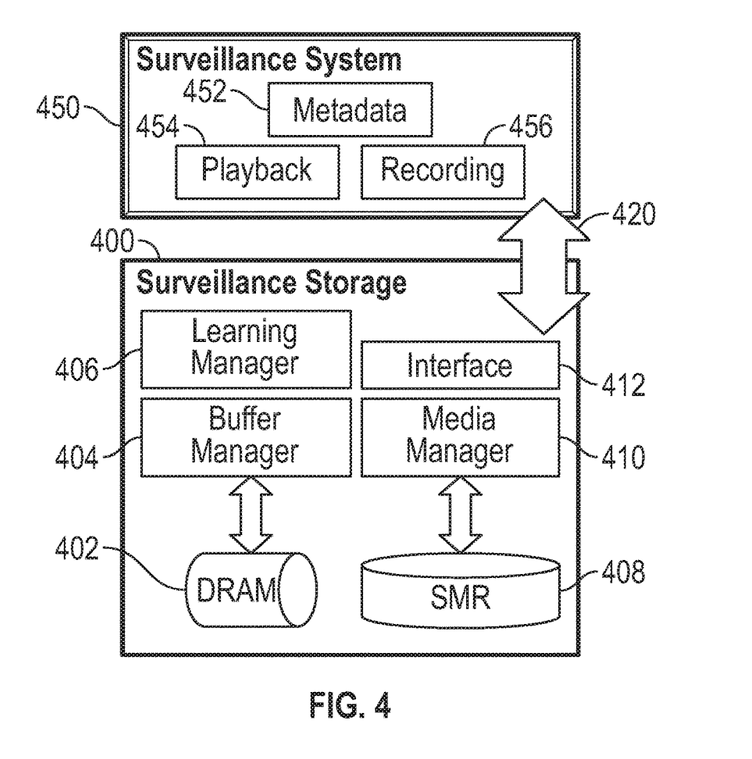
FIG. 4 is a block diagram of a surveillance storage system according to an embodiment of the present disclosure.

Each action that can be run based on a received command has parameters that determine the efficacy of the execution of the command. For example, in a data storage device 400 connected to a surveillance system 450, such as is shown in block diagram form in FIG. 4, parameters that are to be taken into account for storage of data, or retrieval of data, depend on a number of factors. Such factors may include, by way of example only and not by way of limitation, buffer size, cache size, quality of recording, number of cameras, block size, number of blocks to be written or read, and the like. The parameters may also depend on each other. Within the surveillance storage device 400, a cache/buffer 402 and a data storage area 408 are present. Chace/buffer 402 operates under the commands of a buffer manager 404 and in embodiments of the present disclosure a learning manager 406. Data storage 408 operates under the commands of a media manager 410. The surveillance storage 400 may be embodied on a hard disk drive (HDD) such as those disclosed below. Operation of a hard drive and its components is known, and will not be described further herein, other than with respect to FIG. 7. An interface 412 provides communication with surveillance system 450 over communication link 420, which may be wired, wireless, networked, or the like. Surveillance system 450 in one embodiment includes controls for playback 454 and recording 456. Metadata 452 is associated with each portion or part of the surveillance system, such as each camera or monitoring device.

Figure 5A:
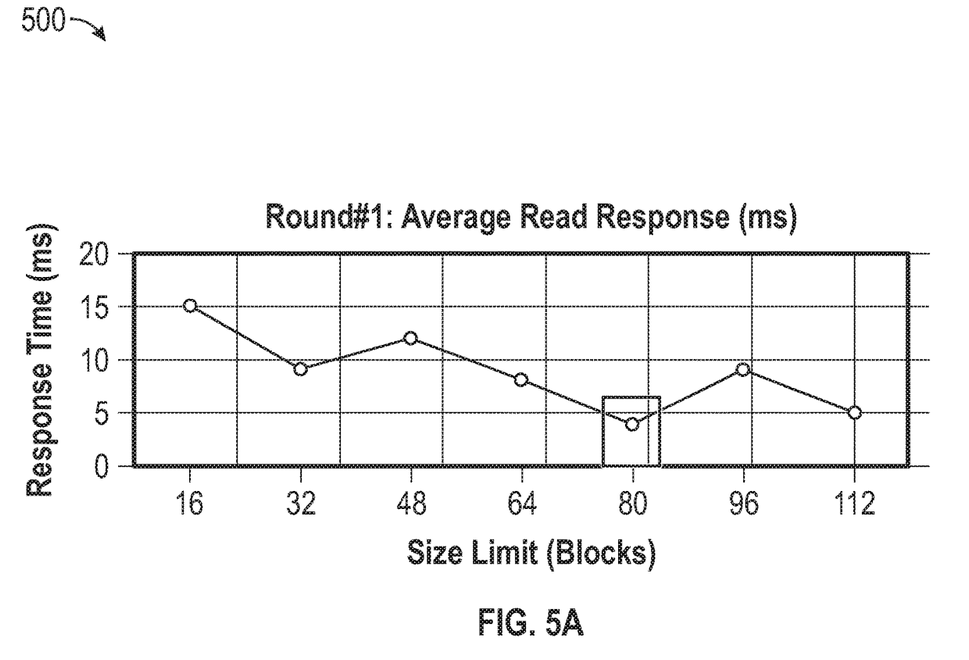
FIGS. 5A and 5B are charts showing operation of an example run according to embodiments of the present disclosure.
Figure 5B:
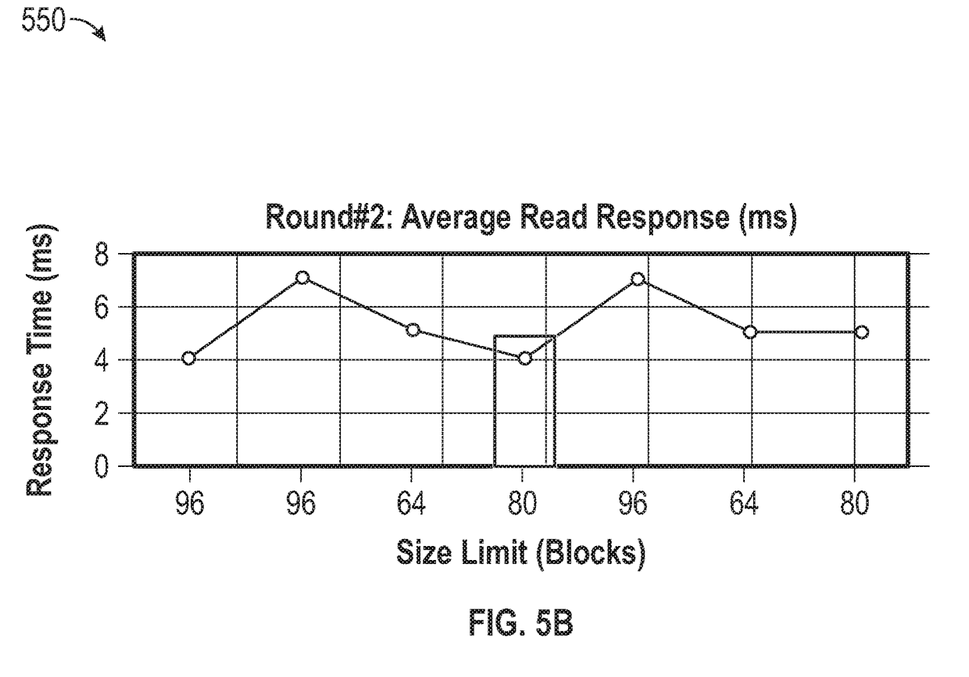

FIGS. 5A and 5B illustrate a representative action of determining a best average read response time of a storage device on a surveillance system. For this action, there is a list of states that the device can be in at one time. For each state listed, there is a list of actions to perform. Each action has different value toward achieving the eventual goal. The expected result from a general application of the embodiments of the present disclosure is a machine learned parameter value or set of parameter values for each action of a specific state. Without machine learning, these parameter values may be partially determined using hand coding by paper analysis, or off-device simulation, or a combination thereof, with the already discussed disadvantages.

Embodiments of the present disclosure can use a variety of possible starting values for parameters. For example, on-board machine learning embodiments may use uniform, random, or other solution sets of parameter values to begin with. Over a period of automatic learning, the values are incrementally updated according to actual performance output feedback. The automated learning processes may be iterated over a long period of time over an entire real-time workload to produce improvements in actions to reach a performance goal, or to improve overall performance for a specific workload.

Learning rates may be adjusted to have a small learning rate, or a larger learning rate. Once actions have been learned sufficiently to have a good idea of the parameter values that provide consistently good results, the learning rate can be adjusted to provide a very small learning rate and a conservative action selector, only changing when, for example, workload changes lead to less desirable results. Also, the learning rate may be made larger with more active action selection around system failure points and operation due to drive underperformance. A learning rate of increasing or decreasing parameter value adjustment may therefore be based on an amount of change in estimated completion time for the command, or to account for failure points and slow performance.

As a non-limiting example, a read response time learning sequence is described below. The read response time learning sequence is discussed for two rounds of learning. It should be understood that as long as refinements are being made to the read response time, many rounds of learning may be done. Further, the learning rate, that is the aggressiveness with which the parameters are changed, may be varied without departing from the scope of the disclosure.

Each action has a set of parameters that are initially assigned to its plurality of parameters. For example, for a read command, one parameter is the number of blocks that are read. The number of blocks read may determine the read time, and such read time may depend also on whether data is buffered or cached. For the example read command, chart 500 shows results of a first round of machine learning according to the embodiments of the present disclosure. Chart 500 shows average response time (in milliseconds) on the vertical axis, and a number of blocks read on the horizontal axis. For each set of blocks read, over the course of multiple iterations of read response time measurements, it is determined that the lowest average read response time is for 80 blocks for the learning sequence of read response time based on a number of blocks being read. Learning may be performed over a large number of iterations as described above. The parameter for this round of machine learning is the number of blocks read.

In this example, the parameter of number of blocks read was populated with evenly spaced values of 16, 32, 48, 64, 72, 80, 96, and 112 blocks. For a second round of machine learning, to determine whether 80 blocks is the best value for the parameter, a second set of values for the parameter, chosen to be more near to the 80 blocks, are selected. For example, round two of machine learning in the example is shown in chart 550. In the round of chart 550, a number of blocks for the parameter values is 96, 96, 64, 80, 96, 64, and 80. These values may be chosen automatically after a first round of learning to cluster around a first round best response. Rerunning machine learning with the second set of values for the parameter again shows that 80 block read response time is lowest. In this example, then, the parameter value of 80 blocks is set as the best response to a read command of the particular action. In the learning mode, storage drive performance may vary up and down in a designed manner as evaluation of values for each action from a set of possible actions to perform is completed.

The example of FIGS. 5A and 5B was run on a simulated basis. The machine learning result was to allow a buffer manager registration of data segments of 80 blocks or less. In the simulations, the workload used per run was 21 minutes long from a failure case. Each action was evaluated on a 3-minute time frame based on average read response time. Total learning time for two rounds was 42 minutes. With this learning result, the standard workload (+1 hr) showed improvement of 35% in average read response (from 9.6 to 6.2 milliseconds (ms)). Additional rounds could be run on actual systems to improve performance further.

Figure 6:
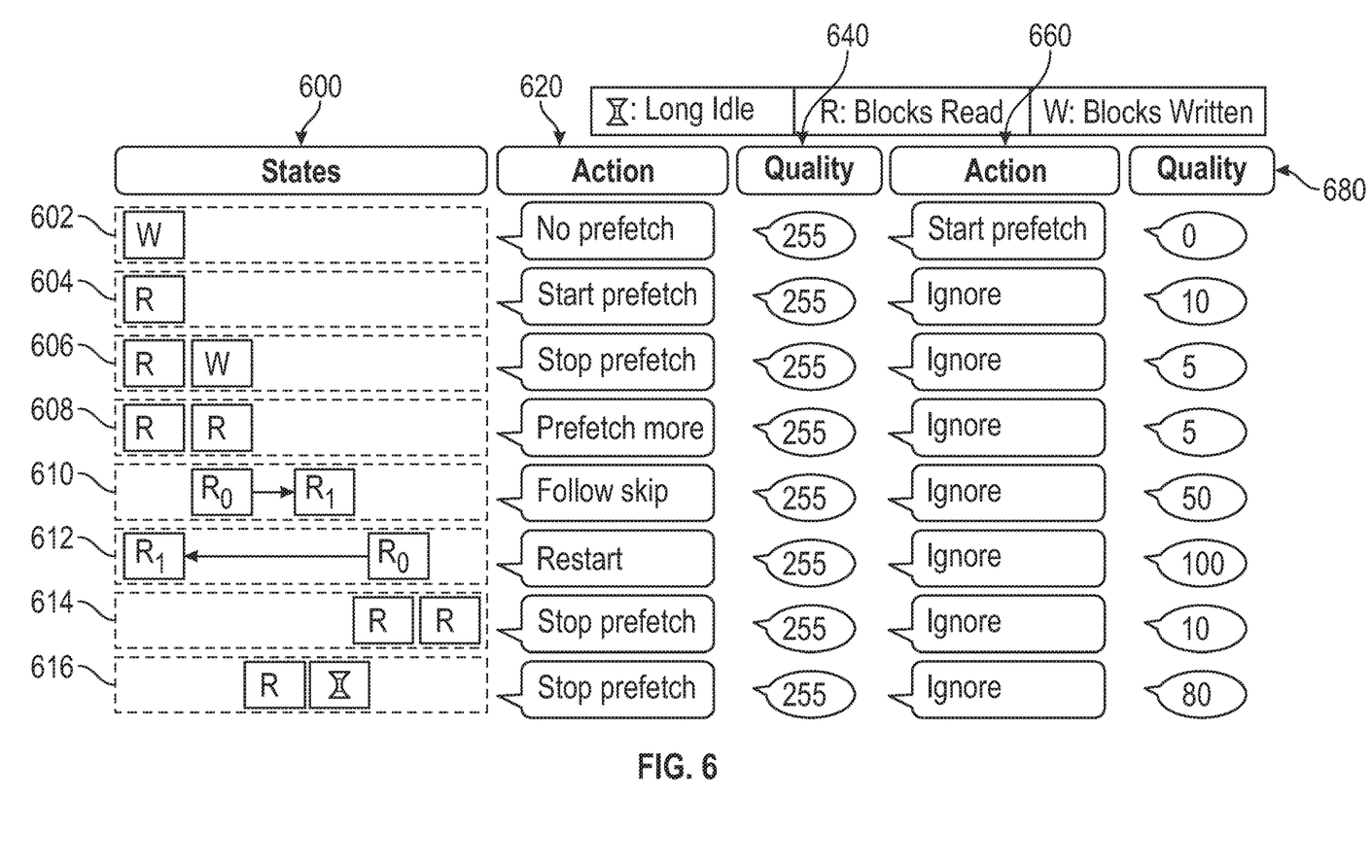
FIG. 6 is a chart of operation of another example run according to embodiments of the present disclosure.

An example of quality improvement by machine learning is shown in FIG. 6. A high end surveillance system typically supports a large number of simultaneous playback streams of different camera recordings. For example, 32 simultaneous playback events may be run in one example. This is a heavy workload for storage device(s) to satisfy the read stream workload so that video playback is smooth without lags. Machine learning may be used in this example to maintain trackers to detect sequential read streams and to schedule disc reading to prefetch data even before a playback request arrives from a host.

In FIG. 6, a read stream tracker and prefetching operation is described, in which machine learning is used to determine improved solutions for prefetching and other operations. In this example, a high-end surveillance system would support a large number of simultaneous playback of different camera recording, for example 32. This amount of cameras adds heavy-lifting for the storage device to satisfy read stream workload in timely fashion so that a user or users watching surveillance video (SV) playback will enjoy smooth video without noticing lags. Machine learning allows in this example the maintenance of trackers to detect sequential read streams and schedule disc reads to prefetch data even before the request from the host arrives, based on monitoring results and learning improved options for response given a specific situation or pattern presented to the data storage device.

In a random array of inexpensive disc (RAID) setting, playback of a read stream is not perfectly sequential. The playback will nearly always have some forward skip and out-of-order arrival. In this example, machine learning is used to determine best policies to prefetch playback streams. During learning, the system and methods of the present embodiments can learn quality of possible actions in different states that will allow learning improved quality of possible actions. In the prefetching overview 600 of FIG. 6, a number of states which are common to read stream and prefetching operations are shown at 602, 604, 606, 608, 610, 612, 614, and 616. Those states involve some combination of blocks written (W), blocks read (R), long idle (I), and specific ordered block reads ($R_0$ to $R_1$ or $R_1$ to $R_0$). Quality measurement in the chart is based in the example on a hit rate from prefetch data. Resource constraints in the example include disc bandwidth and buffer space.

Without any constraint, all the data possibly to be read could be prefetched. This would provide the greatest chance of serving a request from the buffer. However, buffers are simply not large enough to allow such a prefetch of all data. Machine learning is used to determine, given certain states (602, 604, . . . , 616), the best choice for actions to be taken. Actions to be taken are shown at 620 and 640, and the quality (based on hit rate from prefetch data as discussed above) are shown at 640 and 680. Over the course of iterating possible actions of no prefetch, start prefetch, stop prefetch, ignore, follow skip, and restart, the best quality for various actions is determined.

For example, certain states, upon multiple iterations of parameters, lend themselves to a foreknowledge of the likely next request. Each of the states 600 shown in FIG. 6 are evaluated during a learning phase to determine the quality of the answering of a request given the state of the system. For blocks having just been written in state 602, starting a prefetch of data results in a low quality result. However, not prefetching leads to a high quality result.

Similarly, when blocks have been read, as in state 604, starting prefetch has a much higher quality than ignoring. For a read followed by a write as in state 606, stopping prefetch results in a higher quality than ignoring. For each of a series of events, machine learning is used to anticipate what the best action to begin is.

Machine learning is used in this example to determine a best policy for prefetching playback streams based on the current state of the device. Then, upon seeing a pattern, the device can choose the determined best option for the next command that is expected to be received. The choice is based on the machine learning when machine learning has been implemented. The choice is based on what is believed to be the best action when machine learning has not been completed. When machine learning is completed, it can be turned off, and an incoming command is executed with the parameters determined to be the best during machine learning.

Figure 7:
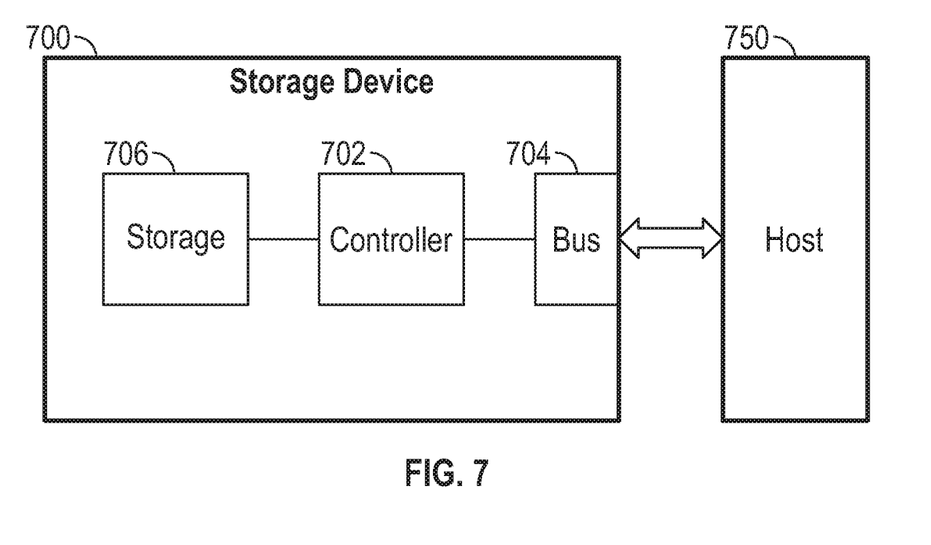
FIG. 7 is a block diagram of a data storage device on which embodiments of the present disclosure may be used.

Referring now to FIG. 7, a simplified block diagram of a storage system 700 on which embodiments of the present disclosure may be practiced is shown. Storage system 700 may be a HDD with platters, a read head, and associated controllers. System 700 may be an SMR or CMR storage device, or a hybrid of HDD and solid state drive, for which embodiments of the present disclosure may be used on the HDD portions. System 700 may include, by way of example, a controller 702 coupleable via a bus 704 or the like to a host system 750, where the host system 750 may provide power over the bus 704 or through a separate power bus (not shown), and a storage component 706 (such as a spinning disk or platter of disks). A graphics processor may be embodied within the storage device as computer readable instructions thereon for performing graphics processing. Alternatively, a separate graphics processor may be used.

The present disclosure may be embodied in a system, a method, and/or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational processes to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving at a storage device a command from a host;
    when learning to monitor performance of the command by the storage device is active in the storage device:
        selecting an initial parameter value of a plurality of parameter values for performing a first action of a plurality of actions for the command, wherein each action of the plurality of actions relates to a manner of performing at least one of a data storage operation or a data retrieval operation by the storage device to satisfy the command from the host, and wherein the first action relates to buffering data associated with the command;
        performing the first action using the initial parameter value of the plurality of parameter values, and monitoring an impact of an amount of data buffered for the command on a quality of performance of the command; and
        changing to a next parameter value of the plurality of parameter values for the command for use in reperforming the first action.

2. The method of claim 1, wherein performing the first action comprises determining and storing a time for the first action using the first parameter value.

3. The method of claim 1, and further comprising:
    repeating performing and changing until action times for each of the plurality of parameter values are calculated and stored; and
    iteratively adjusting parameter values from the initial value or the new value to improve an overall command processing time.

4. The method of claim 3, wherein repeating performing and changing comprises determining and storing a time taken for each reperformed action using a next parameter value of the plurality of parameter values, and for each of the parameter values.

5. The method of claim 4, and further comprising choosing as a best parameter value that parameter value of the plurality of parameter values that returns a lowest time for the performed action.

6. The method of claim 4, and further comprising:
averaging the action times for each iteration of a specific parameter value to obtain an average action time for that parameter value; and
choosing as a best parameter value the lowest average action time for the averaged action times.

7. The method of claim 1, and further comprising determining when learning is active on the storage device by determining whether time remains in a predetermined learning phase for performing and processing the current command.

8. A method, comprising:
receiving at a storage device a command from a host;
performing an action that relates to buffering data associated with the command using a first parameter value of a plurality of parameter values for the action, wherein each different parameter value of the plurality of parameter values relates to a different amount of data to be buffered for the command;
storing an action time for the performed action using the first parameter value;
changing the parameter value to a next parameter value of the plurality of parameter values for the action;
performing the action again using the next parameter value of the plurality of parameter values for the action;
storing an action time again for the performed action using the next parameter value; and
repeating selecting, performing, and storing again until all parameter values of the plurality of parameter values have been used to perform the action.

9. The method of claim 8, wherein the parameter value corresponding to a shortest action time is stored as a preferred parameter value.

10. The method of claim 9, wherein when all parameter values of the plurality of parameter values have been timed for performing the action, the process is repeated for a full learning period of a time determined by a user.

11. The method of claim 10, wherein the shortest time for each action is determined to be an average of the action times by parameter for repeated processes during the full learning period.

12. The method of claim 11, and further comprising changing to a new plurality of parameter values for a new parameter for the command received from the host, and repeating the iteration of the new plurality of parameter values for the new parameter to store a preferred parameter value for the new parameter.

13. The method of claim 8, and further comprising determining when learning is active on the storage device by determining whether time remains in a predetermined learning phase for performing and processing the performed action.

14. The method of claim 8, and further comprising increasing or decreasing a learning rate of parameter value adjustment based on an amount of change in estimated completion time for the command.

15. A non-transitory computer-readable storage medium including instructions that cause a data storage device to:
receive a command from a host;
perform an action that relates to buffering data associated with the command using a first parameter value of a plurality of parameter values for the action, wherein each different parameter value of the plurality of parameter values relates to a different amount data to be buffered for the command;
store an action time for the performed action using the first parameter value;
change the parameter value to a next parameter value of the plurality of parameter values for the action;
perform the action again using the next parameter value of the plurality of parameter values for the action;
store an action time again for the performed action using the next parameter value; and
repeat selecting, performing, and storing again until all parameter values of the plurality of parameter values have been used to perform the action.

16. The non-transitory computer-readable storage medium of claim 15, wherein the instructions further cause the storage device to store the parameter value corresponding to a shortest action time as a preferred parameter value.

17. The non-transitory computer-readable storage medium of claim 16, wherein the instructions further cause the storage device to, when all parameter values of the plurality of parameters have been timed for performing the action, repeat the process for a full learning period of a time determined by a user.

18. The non-transitory computer-readable storage medium of claim 17, wherein the instructions further cause the storage device to determine the shortest time for each action to be an average of the action times by parameter for repeated processes during the full learning period.

19. The non-transitory computer-readable storage medium of claim 18, wherein the instructions further cause the storage device to change to a new set of parameter values for a new parameter for the command received from the host, and repeat the iteration of the new parameter values for the new parameter to store a preferred parameter value for the new parameter.

20. The non-transitory computer-readable storage medium of claim 15, wherein the instructions further cause the storage device to determine when learning is active on the storage device by determining whether time remains in a predetermined learning phase for performing and processing the performed action.

* * * * *

UNITED STATES PATENT AND TRADEMARK OFFICE
CERTIFICATE OF CORRECTION

PATENT NO. : 11,592,984 B2
APPLICATION NO. : 17/018016
DATED : February 28, 2023
INVENTOR(S) : Harry Tiotantra et al.

It is certified that error appears in the above-identified patent and that said Letters Patent is hereby corrected as shown below:

In the Claims

Column 12, Claim 15, Line 15, please insert the word --of-- between the words "amount" and "data".

Signed and Sealed this
Eleventh Day of July, 2023

Katherine Kelly Vidal
*Director of the United States Patent and Trademark Office*